United States Patent [19]

Hench

[11] Patent Number: 4,936,516
[45] Date of Patent: Jun. 26, 1990

[54] ROTARY CUTTER TOOL, PARTICULARLY FOR SHREDDING PLASTIC MATERIALS

[76] Inventor: Hans Hench, Sonnenhalde 31, D-7854 Inzlingen, Fed. Rep. of Germany

[21] Appl. No.: 365,784

[22] Filed: Jun. 14, 1989

[30] Foreign Application Priority Data

Jan. 3, 1989 [EP] European Pat. Off. ........ 89100032.5

[51] Int. Cl.⁵ .............................................. B02C 18/18
[52] U.S. Cl. ................................................. 241/294
[58] Field of Search ................. 241/293, 294, 295, 242, 241/191, 195; 144/172, 174; 407/47, 49, 50, 51, 61, 106

[56] References Cited

U.S. PATENT DOCUMENTS 4,546,929 10/1985 Fritsch et al. ..................... 241/294
4,785,860 11/1988 Arasmith ......................... 144/172 X

FOREIGN PATENT DOCUMENTS 2829732 1/1980 Fed. Rep. of Germany ...... 241/294

Primary Examiner—Mark Rosenbaum
Attorney, Agent, or Firm—Frishauf, Holtz, Goodman & Woodward

[57] ABSTRACT

To permit easy replacement of individual cutter elements (13) located on a cylindrical body (1, 1') formed with essentially axially directed, circumferentially uniformly distributed grooves (5) therein, and in which the cutter elements are held by eccentric clamping bodies (40), and to ensure that the cutting edges of the cutter elements operate on a common theoretical circumferential cylinder, the grooves (5) are formed with internal ppositioning abutments (12, 8) which determine, upon engagement with matching engagement positioning surfaces (26) formed on the cutter elements, the positioning surfaces (26) thereby render the position of the cutter elements in the grooves independent of the cutting geometry of the respective elements. The eccentrics (40) are located, with respect to the direction of the rotation of the body, in advance of the cutter elements (13), so that cutting forces and clamping forces effected by the eccentrics will reinforce each other with respect to positioning of the cutters in the grooves.

16 Claims, 7 Drawing Sheets

ROTARY CUTTER TOOL, PARTICULARLY FOR SHREDDING PLASTIC MATERIALS

Reference to related patent and application, the disclosures of which are hereby incorporated by reference: U.S. Pat. No. 3,887,975, Sorice et al. U.S. Ser. No. 07/349,632, filed May 10, 1909, by the inventor hereof, entitled "ROTARY CUTTER, PARTICULARLY FOR COMMINUTING PLASTIC MATERIAL"

The present invention relates to a rotary cutting tool, particularly adapted for shredding or comminuting plastic materials.

BACKGROUND

Cutting tools for shredding material usually have a rotary body structure formed with essentially axially extending grooves into which cutter bits, for example in strip form, can be inserted, and held in the grooves, for example by clamping arrangements. The cutter bits should be replaceable since they wear. Usually, the direction of the cutter bits or strips is slightly inclined with respect to the axis of rotation of the tool, for example by about 2°–3°.

The cutter bits or strips are usually made of ceramic, stellite, or hard metal. The cutter bits or strips are subjected to high wear, particularly when comminuting or cutting plastics which have been reinforced, for example by reinforcing fibers. It is therefore necessary to so construct the rotary cutter that the cutting elements themselves can be replaced so that sharpened edge portions of the cutters, or the cutter bits themselves, can be replaced as needed.

Many types of cutter bodies and cutter elements are known. The cutter elements are customarily clamped in the cutter body structure. One clamping arrangement utilizes a clamping system in which a cutter bit or strip is pressed against a longitudinal wall of the groove in which the cutter bit is inserted, acting on the cutter element so that the side wall of the grooves is pressed on the cutter element counter the direction of rotation. This provides for effective holding of the cutter bits; yet, the cutting forces acting on the cutter bits are directed counter the direction of clamping forces so that the clamping forces initially applied must be very high.

Superficially, comminuting cutters, and particularly comminuting cutters for plastic material, are somewhat similar in cross section to groove milling cutters. U.S. Pat. No. 3,887,975 Sorice et al describes a groove milling cutter. Contrary to comminuting tools, however, groove mill cutters have axially narrow cutter inserts or cutter chips. The referenced U.S. Pat. No. 3,887,975 shows cutter inserts which can be turned over, so as to provide two cutting edges, which are somewhat parallelogram-shaped, and located, uniformly spaced, about the circumference of a circular disk in recesses having parallel walls.

The leading wall of any recess, with respect to the direction of rotation of the groove mill, receives an eccentric which can be turned into the groove or recess, and which engages in a correspondingly shaped recess in the cutter insert. Due to the narrow width of the cutter inserts, the forces applied thereto will be different from forces acting on axially elongated cutter strips.

The cutter chips of the groove milling cutter are radially clamped with a free surface, not having cutting action, against the bottom of the recess or groove. If the portion of the cutter blade which is engaged with the bottom of the groove previously was an active cutting edge which has been worn, the radial position of the then outermost cutting edge will be different from that if a new chip is inserted. Thus, the radial position of the outermost cutting edge is not independently determined, and turning-over the cutter chip may place the chip in such a position that the outer edge of the turned-over chip is not on the same cylindrical theoretical surface of new cutter chips which have not been turned over. As a result, the forces acting on the respective individual cutter chips will be different.

THE INVENTION

It is an object to provide a rotary cutting tool, particularly adapted for comminuting or shredding plastic materials, in which the cutter elements or strips can be held in stable position and, once inserted, will be placed therein accurately located, while being readily releasable, and in which the overall tool, including the replaceable bits or strips can be readily and inexpensively manufactured.

Briefly, the cutter elements are formed with engagement positioning means, for example shoulders or the like, which are so placed on the cutter bits that they, upon abutting positioning abutments formed in the grooves, will always reliably position the cutter elements so that the cutting edges thereof will be on a common theoretical circle or cylinder. Eccentrics are provided to hold the cutter strips in position, and located, with respect to the direction of rotation of the body, in advance of the cutter elements.

The arrangement has the advantage that the positioning abutments means formed in the groove, in combination with the engagement positioning means, for example shoulders formed of the cutter elements, ensure that the cutting edges of all the cutter elements will be on a common theoretical circle, without further re-adjustment or re-positioning of the cutter elements. Thus, all the cutter elements are accurately positioned, in which the actual position thereof is determined solely by the respective positioning abutments and engagement positioning shoulders located, respectively, in the grooves and on the cutter bits themselves. Grinding of the edges, or shaping the edges in a specific desired manner does not affect the radial position of the outermost edge of the cutter bit strip.

In accordance with a feature of the invention, the holding arrangements, typically eccentrics, positioned in advance of the cutter bits ensure that cutting forces acting on the cutter bits are applied thereon in the same direction as the holding forces of the eccentrics. Thus, counter-acting application of forces on the cutter bits, namely counter-acting forces due to the cutting action and to the holding elements which may partly cancel each other, are effectively avoided. It is important that the holding forces are not diminished by external effects, for example by the operation of the tool body, since outward projection of any cutter bit, for example due to centrifugal force upon rotation of the body, may be extremely dangerous.

DRAWINGS

DETAILED DESCRIPTION

Figure 1:
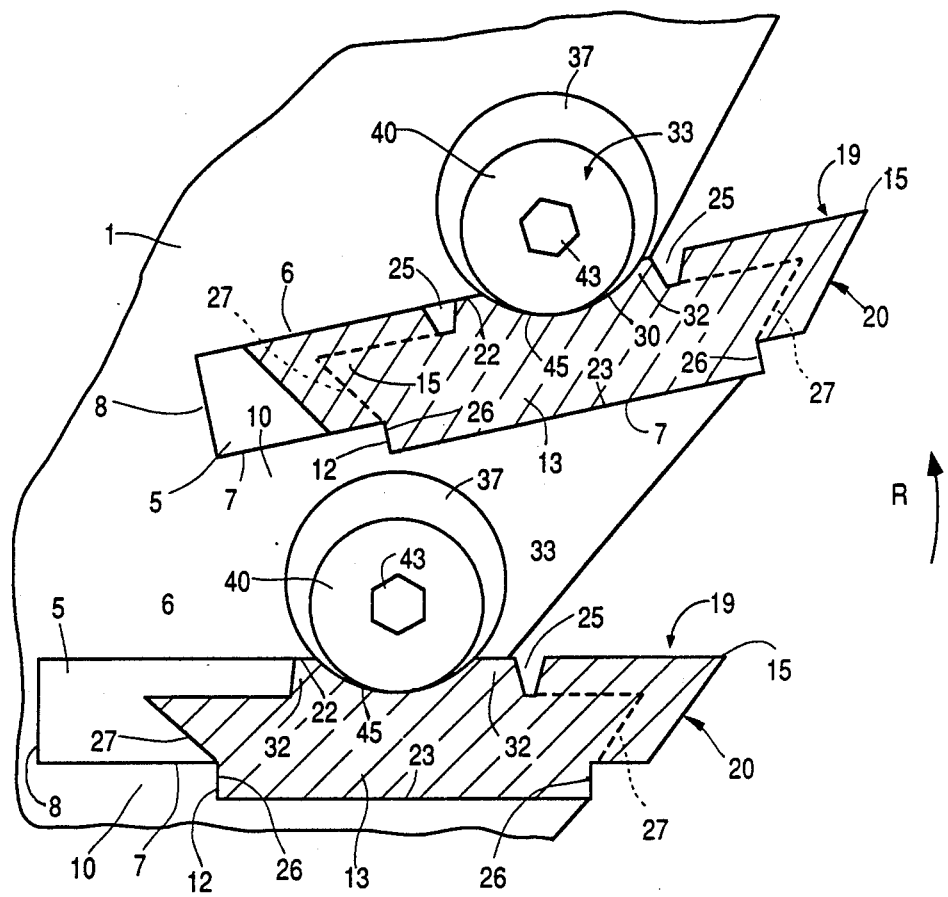
FIG. 1 is a fragmentary part-sectional axial view of a cutter body showing two cutter elements positioned adjacent the circumference thereof.
Figure 2:
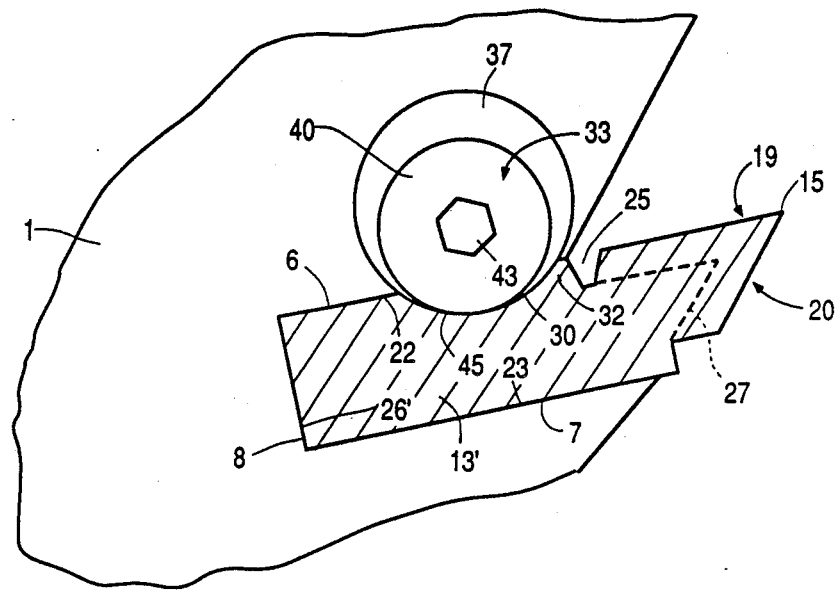
FIG. 2 is a fragmentary part-sectional axial view of another embodiment of a cutter body and cutter strip.

Referring first to FIGS. 1 and 2, which show two different embodiments of cutter elements in suitable body structures adapted to hold the respective cutter elements.

A massive cylindrical body (see FIG. 3) holds cutters 13. made of steel. Body 1 is formed with a coaxial through-bore 2, forming a hub, in order to receive a shaft (not shown) to rotate therewith. Circumferential clamping elements 3 are located in the body 1, close to the bore 2, to clamp the body 1 to a shaft. The cylindrical body 1 can be coupled to similar cylindrical bodies axially adjacent thereto, and to ensure fit and synchronous rotation, the body 1 is formed with projecting pins or stubs 4, which fit into matching openings in an adjacent body 1, so that a plurality of cutter units can be assembled together into a cutter tool of substantial axial length.

The body 1 is formed with a plurality of circumferentially uniformly spaced, essentially axially extending longitudinal grooves 5 (FIG. 1). They are inclined with respect to a radial plane passing through the axis of rotation of the body 1 by an angle of about 2° to 3°. This slight inclination decreases the noise level when the tool is in operation. Since the angle is small, the grooves can be referred to as extending "essentially" axially, it being understood that, preferably, they do not extend precisely in axial direction. The grooves 5 are bounded by two side walls 6, 7, and a bottom wall or root 8. The side walls 6 and 7 may, for example, be parallel and, in the illustration shown, extend in parallel to each other.

In accordance with a feature of the present invention, and shown in FIG. 1, the side wall 7 is formed with a step 10, defining thereby a positioning abutment 12. The step 10 extends at a right angle from the side wall 7. A cutter element 13, as will be described, is so shaped that it can fit against the abutment 12 so that it can be positioned in the groove 5 in precisely adjusted location.

In the embodiment according to FIG. 2, the radial depth of the groove 5 is less than that of the groove in FIG. 1, so that the bottom 8 of the groove is at the same level as the step 10 forming the abutment 12. In the embodiment of FIG. 2, the step 10 can be omitted.

Cutter elements 13 are fitted in the grooves 5. As illustrated in FIG. 1, the cutter elements 13 have an essentially trapezoidal cross-sectional shape. They are reversible, that is, they have two cutting edges 15 at respective ends, so that if one cutting edge 15 becomes dull, the cutter elements 13 can be flipped over and a newly sharpened edge presented to the outer circumference for further operation. The cutter elements 13 may be made of a hard metal, ceramic or stellite; in the region of the cutting edge 15, they are formed with a chip surface 19 and a trailing rake 20. The chip surface 19 and the rake 20 form an acute angle of, for example, about 35°. The chip surface 19 is a portion of a wider main side surface 22 of the cutter element 13. The opposite side surface 23 is parallel to the side surface 22. The free edges remote from the cutting edge 15 of the chip surface 19 and the rake surface 20 terminate in freely accessible end portions. The chip surface 19, thus, terminates in a slot 25. Slot 25 facilitates re-grinding of the cutter element 13, that is, to re-sharpen the edge 15. The broken line 27 (FIG. 1) shows the maximum material removal which can be obtained with a cutter element upon re-grinding. When the cutter element has been re-ground to the extent that surfaces 19, 20 have reached the position shown by the broken line 27, it is possible to still re-use the cutter element by turning it over. FIG. 1, at the lower representation, shows a cutter element which has been ground down to the surface 27, at the left side of FIG. 1, and which has been turned over, thus presenting new surfaces 19, 20 with a new cutting edge 15 for operation.

In accordance with another feature of the invention, the cutter elements 13 are matched to the shape of the groove by being provided with engagement positioning steps or abutment surfaces 26. The surfaces 26 are so dimensioned with respect to the original cutting edge 15 that a precise distance from the abutment 12 to the edge 15 is obtained. Thus, the engagement position surface 26 provides for precise placement of the cutting edge 15 with respect to the axis of rotation of the body 1; as shown in FIG. 1, the surfaces 26 and the abutments 12 are so located that even a new tool will be clear of the root 8 of the groove 5.

In the embodiment of FIG. 2, the cutter element 13' is formed with only a single cutting edge 15; the single edge, the surfaces 19, 20, and the slot 25 are all similar to the same features described in connection with FIG. 1. Contrary to FIG. 1, however, the cutter element 13' cannot be turned over but, rather, the cutter element is formed with an engagement positioning surface 26' which extends to the root 8 of the groove 5 and is engaged against the root 8, the root 8 and the surface 26' being dimensioned with respect to the edge 15 to provide for predetermined location of the edge 15 with respect to the axis of rotation of the tool 1. The engagement positioning surfaces 26, 26' extend at right angle with respect to the main side surfaces 22, 23 of the tool elements 13, 13', respectively.

The cutter elements 13, 13' are formed with a circular segmental recess 30, which extends over the entire axial length of the cutter element. The maximum depth of the recess 30 is approximately one-fifth of the transverse dimension of the respective cutter elements 13, 13'.

As shown in FIG. 1, two ridges or ribs or strips 32 will remain adjacent the recess 30 along the surface 22 of the cutter element 13. These ridges 32 extend up to the adjacent slots 25. The engagement positioning surfaces 26 are positioned precisely symmetrically with respect to the recess 30 so that, upon turning over of the cutter element 13, the position of the edge 15 will be predetermined.

The cutter element 13' (FIG. 2) has only one such ridge 32, namely at the outwardly directed side, adjacent the recess 30. The ridge or rib 32 extends up to about the slot 25. The main side surface 22 continues, with respect to FIG. 2, at the left from the recess 30 until it meets the bottom engagement positioning surface 26'. The rear main side surface 23 is entirely engaged against the side wall 7 of the longitudinal groove 5.

Each one of the longitudinal grooves 5 has an individual clamping arrangement 33 located therein, adapted to clamp the respective cutter elements 13, 13'. The clamping arrangement 33 is a two-part structure and, with respect to the direction of rotation indicated by the arrow R (FIG. 1), is positioned in advance of the cutter element 13. The clamping arrangement 33 is divided into clamping systems, one on either side of the tool body 1 (see FIG. 3); the clamping arrangements are mirror-symmetrical with respect to each other and, otherwise, identical. Only one of them, therefore, will be described in detail.

Figure 3:
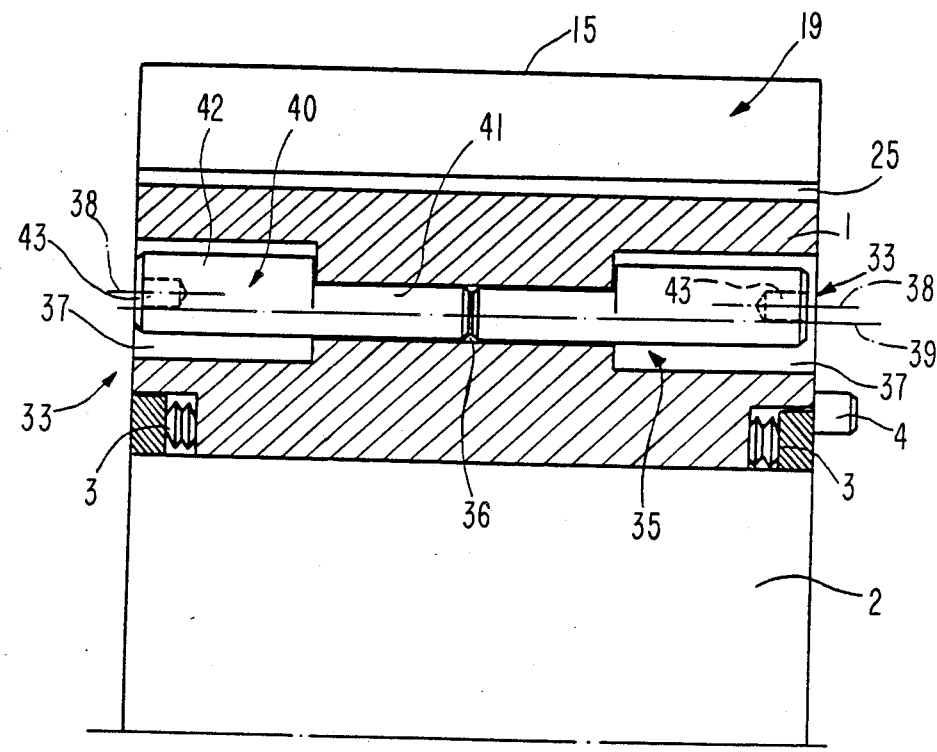
FIG. 3 is a longitudinal axial view of the cutter of FIG. 1, to a smaller scale.

As best seen in FIG. 3, a stepped bore 35 passes through the tool body 1, located parallel to each groove 5. The stepped bore 35 has an inner cylindrical bore portion 36 and two outer eccentrically located blind bores 37 of larger diameter. The bore axis 38 of the blind bores 37 is offset with respect to the axis 39 of the through-bore 36, see FIG. 3. Two otherwise identical eccenters 40 are fitted into the stepped bore 35 from the two end surfaces. The clamping elements 40 form eccentrics.

Each one of the clamping elements 40 has a cylindrical bearing portion 41, rotatable in the bore 36, with central axis 39. The bearing portion or bearing element 41 extends, towards the outer or face ends of the body 1, to form a cylindrical eccentric portion 42, located within the blind bore or eccentric recess 37. The eccentrics 42 are formed with tool engagement elements, for example hexagonal Allen wrench socket or similar engagement recesses 43 which, upon engagement with a suitable wrench, permit rotation of the clamping element 40 about the axis 39 of the bore 36.

The cylindrical eccentric bore 37 intersects the longitudinal groove 5, see FIG. 1. The diameter of a theoretical surface which is defined by the recess 30 on the cutter elements 13, 13' and the diameter of the eccentric bore 37 are, in the embodiment selected, to be the same so that a cutter element 13, 13' fitted into the groove 5 completes the missing portion of the blind bore 37 by its recess 30.

The eccentricity of the eccentric 42 with respect to the bearing portion 41 in the through-bore 36 is so selected that upon a rotation of the eccentric 42 over about 180° the eccentric is completely rotated into the recess 30 of the tool element 13, 13'. The eccentric 42 then will engage the respective element 13, 13' in a clamping region or clamping position 45 within the recess 30. When the eccentric 42 is rotated, the eccentric will lock itself in position by the self-clamping or self-locking effect. Upon this clamping, the respective cutter element 13, 13' is clamped tightly with its rear main side surface 23 against the side wall 7 of the longitudinal groove 5 and, further, its engagement positioning surface 26, or 26', respectively, is clamped against the positioning abutment 12 (FIG. 1) or 8 (FIG. 2).

The position of the clamping point or clamping line or clamping region 45 is at the left of the lowest point of the recess 30, if the eccenter 42 is rotated in clockwise direction, looked at from the side of FIG. 1. By counterclockwise direction, the the clamping elements 40 will be released; upon continued rotation of the eccentric until the eccentric 42 is clear from the recess 30, the cutter element can then be removed merely by radial pulling, and taking it out of the groove 5.

In an operative example, and to provide a general view of operating conditions of a plastic comminuting or shredding cutter, the tool body 1 may have diameters from between about 8 to 12 cm, and rotating at between about 700 to 1000 rpm. Twenty-four cutter elements 13 can be located on such a tool body, uniformly distributed about the circumference. This is only one example, however, since the body 1 can be made of substantially different sizes; for example, with a diameter of about 20 cm of body 1, thirty-two cutter elements 13 can be used.

EMBODIMENT OF FIGS. 4 AND 5

Figure 4:
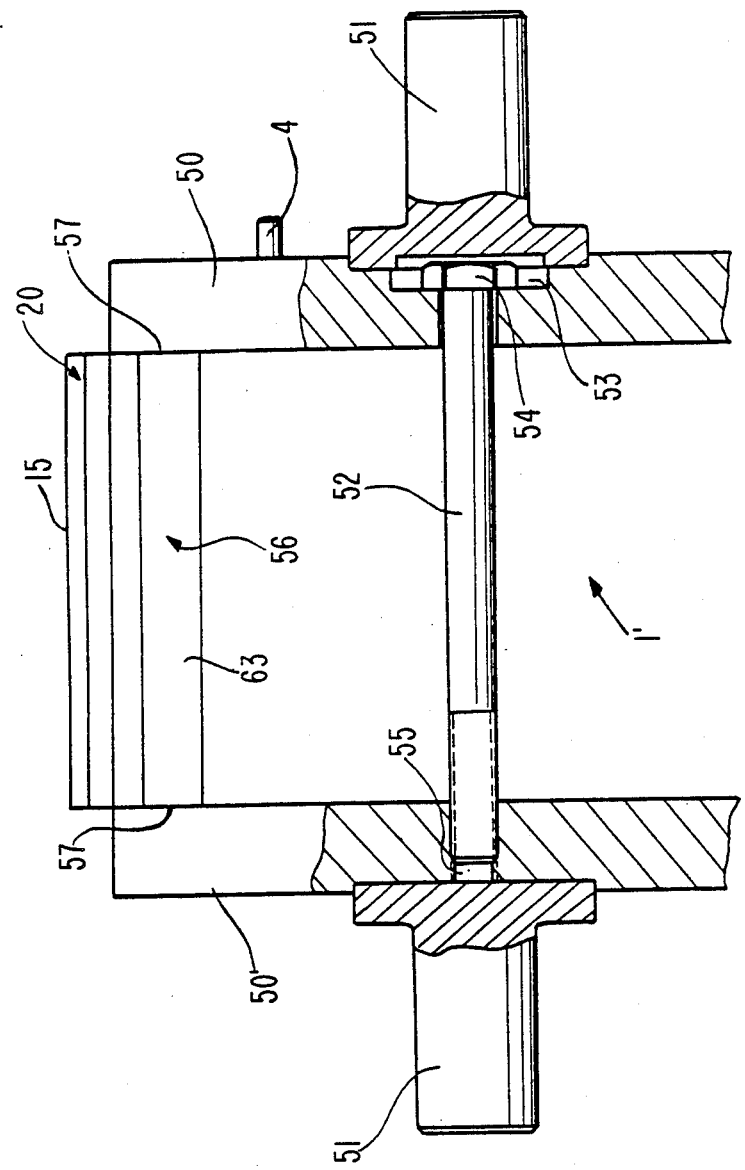
FIG. 4 is a longitudinal part-sectional view illustrating another form of cutter body, partly cut away, and omitting features not necessary for an understanding of the invention.
Figure 5:
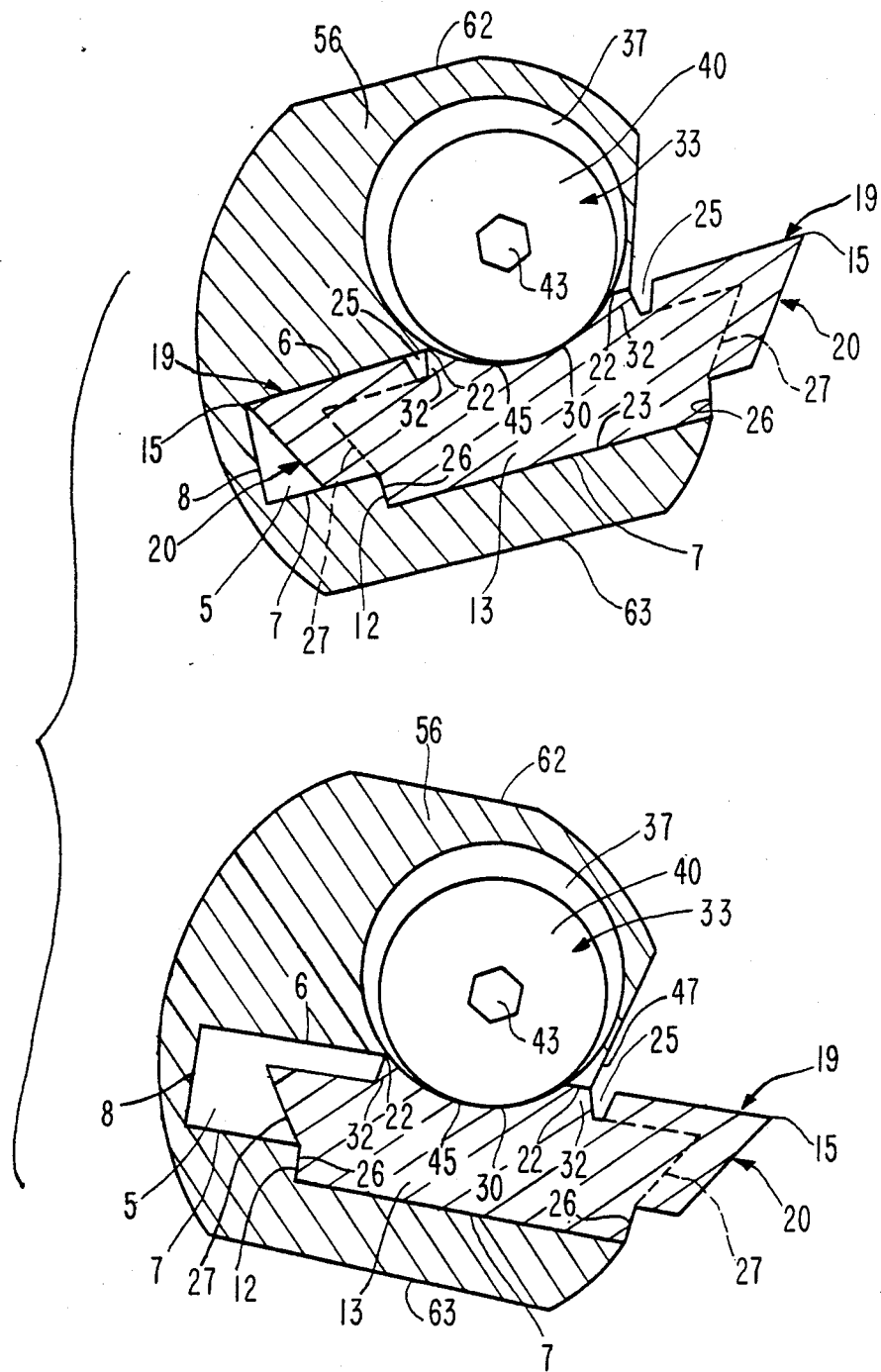
FIG. 5 is an enlarged view of the receiving portion of a cutter strip of the body structure of FIG. 4.

The tool body 1', in accordance with the embodiment illustrated in FIGS. 4 and 5, is not a solid body but, rather, is formed of two disk elements 50, spaced from each other, and includes holder elements 56 for the cutter elements 13, 13' respectively. The holder elements 56 are rod or bolt-like, circumferentially located on the disks or wheels 50, with spaces therebetween. Comminuted plastic material, cut by the cutters 13, can pass or fall through the spaces between holders 56. They can be collected in a suitable receiver, not shown.

The holders 56 are clamped to the disks 50 without play. A clamping bolt 52 is provided to clamp the disks 50 together. As seen in FIG. 4, the right disk 50 has a stepped through-bore 55 through which the bolt 52 extends, and which receives the head 54 of the bolt 52. The left disk 50' is formed with a tapped hole 55, into which the bolt 54 is threaded. Upon tightening of the bolt 52, the disks 50 are pressed against the lateral surfaces 57 of the holders 56, to hold them securely therein. Preferably, the disks 50, 50' are formed with recesses into which the holders 56 can fit - not specifically shown in the drawings, since this is a well-known constructional feature, so that an interengaging projection-and-recess fit between the holders 56 and the disks 50, 50' can be obtained. Alternatively, other attachment arrangements may be used to hold the holders 56 in tight engagement with the disks 50, 50'. The disks 50 retain external bearing stubs 51 at the outside for retention of the disks in a suitable bearing, driving the cutter body 50, 50', 56.

Two holders 56 are shown in FIG. 5 in the position they would have when clamped on disks 50. The cutter elements 13 are clamped by clamping arrangement 30 identical to those described in connection with FIG. 1.

Figure 7:
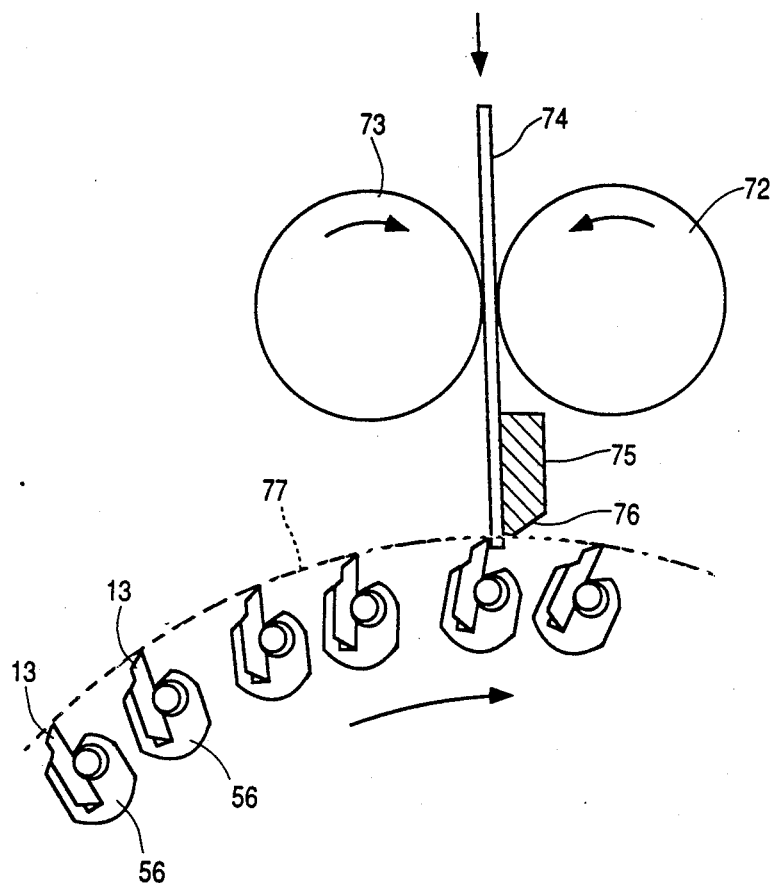
FIG. 7 is a fragmentary side view of cutter elements on a cutter body positioned to receive plastic material to be comminuted or shredded, and to a scale different from that of the other drawing figures.

To ensure free passage of comminuted material between the holder elements 56, the holder elements have facing flat surfaces 62, 63, extending parallel to the axes of rotation, and laterally defining the respective holder elements 56. As seen in FIG. 7, spaces are formed between the respective holder elements to permit free passage of chipped or shredded plastic.

Figure 6:
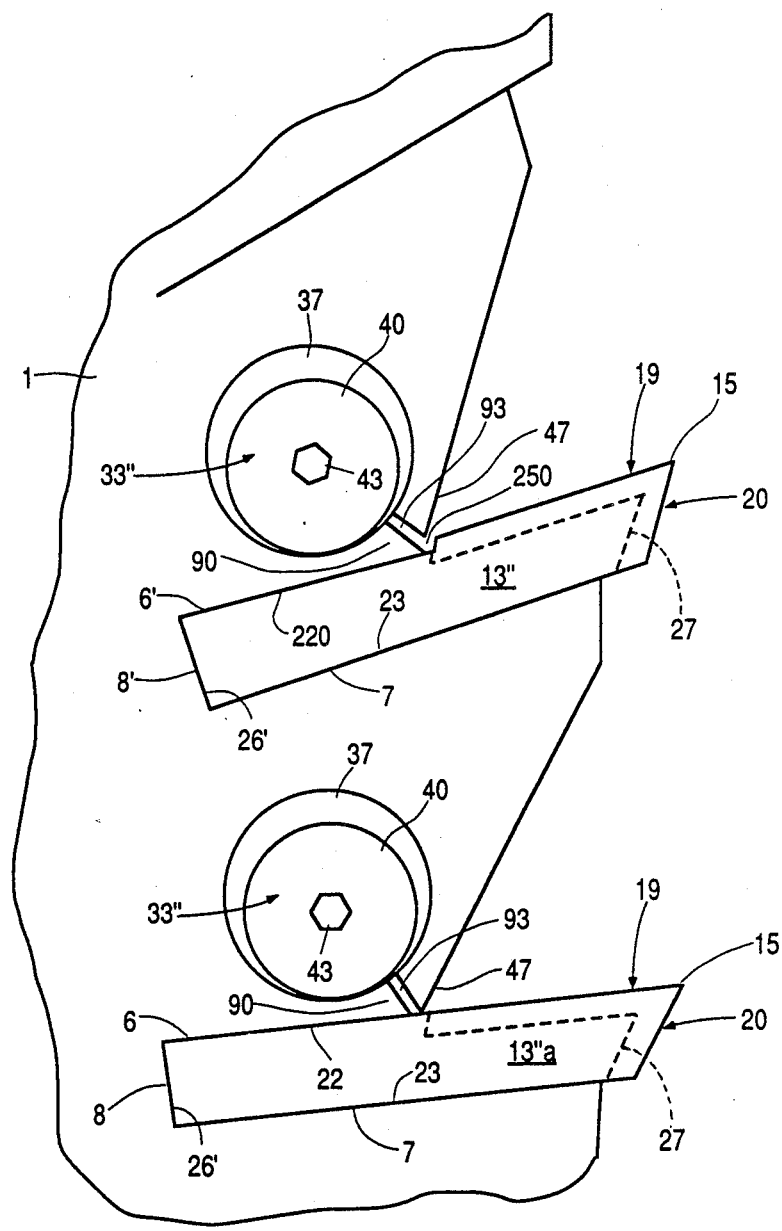
FIG. 6 is a view similar to FIG. 1 and schematically illustrating positioning of cutter elements.

FIG. 6 illustrates further arrangements to clamp the cutter elements in the grooves 5. FIG. 6 illustrates cutter elements 13'' located in a body 1.

The forward side wall 6' of groove 5 forms an angle of about 88° with the bottom or root 8' of the groove 5. The bottom or root 8' is flat. The rear side wall 7 extends at a right angle to the bottom or root 8' of the groove 5. Dur to the angle of the side wall 6, the cross section of the groove 5 narrows outwardly from the axis of the body 1. The cutter element 13' is fitted in this outwardly narrowing groove 5, and has the same shape as the narrowing cross section of the groove 5. The basic shape of the cutter element 13' has parallel flanks. To obtain the wedge shape, the main side wall 22' of the cutter bit 13'' is formed with an angular recess 220, which is at an inclination of about 2° with respect to a line parallel to the side wall 23, and parallel to the main side wall 22. The lower cutter bit shown in FIG. 6 has a different upper main side wall 22, i.e. parallel to wall 23. The recess 220 (upper cutter bit of FIG. 6) extends slightly above the edge of the groove 5 in the cutter bit 13″, and, thereby, has the same function as the slot 25 in the cutter element 13, FIG. 1. The chip surface 19 is parallel to the rear main side surface 23. The side wall 7 of the longitudinal groove extends up to about the region of the maximum grinding line 27 of the cutter element 13″, and supports the cutter element 13″ with respect to cutting forces acting thereagainst if the body 1 rotates in the same direction as shown by the arrow R in FIG. 1.

The clamping arrangement 33″ has eccentrics of essentially the same construction as previously described; it differs, however, insofar as the clamping elements 40 do not engage into a recess of the cutter element 13″ but, rather, engage a clamping portion 90 which is part of the tool body 1 against the main side surface 22 in the region of the recess 220 of the cutter element 13″. The clamping portion 90 is defined by a slit 93 on one side which extends from the outer circumference 47 of the tool body 1 over its entire length in the region of the respective bores 37, in radial direction. Upon turning or twisting the eccentric 40, the clamping element 90 is elastically deflected about its root region and presses against the main side surface 22 of the cutter element 13″.

The tool body 1 can retain cutter elements of different shapes. Thus, the groove may have parallel side walls 6, as shown in FIG. 6 with respect to the lower cutter elements, which corresponds, in general, to the cutter element 13′ (FIG. 2) and shown at 13″a. It has parallel side walls and, except for the absence of the recess 30, is otherwise similar to the cutter element shown in FIG. 2. Clamping is effected as shown in connection with the upper cutter element 13″, namely by deformation of a portion of the body 1 in the region of the circumference.

Of course, the arrangements to clamp the cutter elements need not be formed in the solid body but, rather, can also be provided in the disks, as described in connection with FIGS. 4 and 5.

FIG. 7 is a schematic illustration of a shredder or granulating apparatus in which the cutter which is used is formed as described in connection with FIGS. 4 and 5. The cage-like body 1′ has been omitted for ease of illustration.

Two oppositely rotating friction transport rollers 72, 73, of which at least one is driven, feed elongated plastic material 74, for example in strip or web form, from an external supply towards the cutter. The plastic is fed over a fixedly secured knife 75, which has an edge 76 just slightly above the theoretical circle 77 defining the edges 15 of the cutter elements 13, to form a cutting position. The plastic material, for example if fed in strip or string form, which is preferred, will then result in plastic granules. A plurality of such strings or ropes of plastic can be located axially distributed, so that each cutter element 13 cuts a plurality of plastic strings at various positions along the circumference thereof. A plurality of such supply systems 72, 73, 75 can be located around the circumference of the cutter element to provide multiple cutting around the circumference so that a cutter having only limited axial length can provide high cutting output.

The length of the granules, or chips therefrom, which are cut from the plastic strings or ropes, will depend on the feeding speed of the material 74, the spacing of the cutter elements 13 from each other, and the rotary speed of the cutting tool.

Various changes and modifications may be made, and features described in connection with any one of the embodiments may be used with any of the others, within the scope of the inventive concept. The various dimensions given above are not critical; for example, the depth of the recesses 30 (FIGS. 1, 2) in the cutter elements 13, 13′ may vary between about 15 to 35% of the cross-sectional dimension of the respective cutter tool. The angle with which the groove surface 6′ (FIG. 6) extends towards the circumference also may vary, and preferably is between about 85°–88°, which will then require a matching recess angle of the surface 220 of between 5° and 2°. These are preferred ranges which can be varied as desired. To remove cutter elements 13″ from the converging or tapering slot, it would only be necessary to release the eccentric clamp 40, and then slide the cutter element out of the groove in axial direction.

I claim:

1. Rotary cutter tool, particularly for shredding plastic materials, having
    an axially elongated cylindrical body structure (1, 1′) formed with a plurality of essentially axially directed circumferentially uniformly distributed grooves (5), and defining axially oppositely positioned sides;
    a plurality of elongated removable cutter elements (13, 13′, 13″, 13″a) located in respective grooves;
    a plurality of pairs of eccentric clamping means (33, 33′, 33″, 40) for releasably clamping the cutter elements in the grooves,
    wherein the grooves are formed with essentially flat groove side surfaces (6, 7) and with an internal positioning abutment means (12, 8, 8′);
    the cutter elements (13, 13′, 13″, 13″a) are formed with essentially flat side surfaces (23) and with engagement positioning means (26) which are complementary to said groove side surfaces and to said positioning abutment means in the grooves, so that, upon engagement of the engagement positioning means on the cutter elements with the positioning abutment means in the grooves, the cutter elements are positioned with cutting edges (15) thereon in predetermined located with respect to the circumference of the cylindrical body,
    said engagement positioning means being independent of the cutting geometry of the respective element;
    wherein the cutter body structure (1) is formed with clamping portions (90) located adjacent said grooves (5), said clamping portions having limited elastic deflectability;
    wherein the eccentric means (40) are located, with respect to the direction of rotation of said body structure, in advance of the cutter elements (13, 13′, 13″, 13″a); and
    wherein said eccentric clamping means (40) are located within the cylindrical body and the eccentric clamping means of any one pair extend into said body structure from opposite sides of the sides of said body structure and, upon rotation of the eccentric means, engagement with the clamping portions (90) of the cutter body structure move the clamping portions towards and in engagement with the cutter elements (13", 13"a) located within said groove.

2. The tool of claim 1, wherein the cutting elements (13), in cross section, are essentially trapezoidal and formed with essentially parallel flanks (22, 23);

and wherein at least one (22) of said flanks has a surface portion (19) thereof formed as a chip or cutting surface.

3. The tool of claim 1, wherein said engagement positioning means comprise an engagement positioning surface (26, 26') angled off from said main surface (23) and extending over at least a portion of the transverse dimension of the cutter element (13).

4. The tool of claim 3, wherein the positioning abutment means formed in the grooves comprise a stepped portion (26) of the groove defining an abutment surface;

wherein the engagement positioning means (26) of the cutter element comprises a shoulder surface (12) engageable with said stepped surface (26), and spaced from a cutting edge (15) by a predetermined distance;

and wherein the groove (5) has a depth which is greater than said spacing to permit placement of the cutting element in the groove with said cutting edge facing the bottom or root (8) of the groove while being spaced therefrom, with clearance.

5. The tool of claim 3, wherein the engagement positioning means (26') of the cutter elements extends across essentially the entire cross-sectional dimension of the cutter element (13');

and wherein said positioning abutment means (8) is formed by a root or bottom surface (8) of the groove.

6. The tool of claim 1, wherein said groove (5) defines side walls (6, 7) extending from the circumference of the body structure (1) inwardly;

and wherein at least one of said side walls (6, 7) is inclined in the direction of the bottom or root (8) of the groove.

7. The tool of claim 6, wherein at least part of the side wall which, with respect to the rotation of the body structure is in advance of the cutter element, is inclined with respect to a surface (8') defining the bottom or root of the groove (5) by an angle of between about 85°–88°.

8. The tool of claim 6, wherein the cutter element (13") is formed with two major surfaces extending longitudinally thereof, at least one (220) of said surfaces being formed with a wedge-shaped recess;

and wherein the cross-sectional shape of the cutter element (13"), at least within the region of the inclined surface (6') of the longitudinal groove, matches, essentially, the shape of said inclined surface.

9. The tool of claim 1, wherein said body structure forms an open cage structure including elongated holder elements (56) forming circumferentially spaced elements of said structure, said cutter elements (13, 13', 13", 13"a) being retained in said holder elements, said holder elements leaving a free space therebetween to accept chipped material, and being uniformly spaced from the axis of rotation of the cylindrical body structure forming said cage structure (1, 1').

10. The tool of claim 9, wherein said holder elements (56) are formed with mutually facing, essentially flat side surfaces (62, 63) which, between themselves, define the spacings or gaps between adjacent holder elements for passage of cut or shredded material.

11. The tool of claim 1, wherein the body structure is formed with a plurality of axially extending bores (35) located parallel to said grooves (5) and positioned radially in alignment with said grooves, said bores having inner bore portions (36) and two outer bore portions (37) located adjacent said sides, said eccentric clamping means being located in said two outer bore portions.

12. The tool of claim 11, wherein said two outer bore portions are eccentrically located with respect to said inner bore portions (36), said eccentric clamping means of said pairs being located in said outer eccentric bore portions and rotatable about an axis (38) offset with respect to the axis (39) of said inner bore portions (36).

13. The tool of claim 1, wherein said body structure forms an open cage structure including elongated holder elements (56) forming circumferentially spaced elements of said structure, said holder elements leaving a free space therebetween to accept chip material and being uniformly spaced from the axis of rotation of the cylindrical body structure, forming said cage structure;

wherein said cutter elements (13, 13', 13", 13"a) are located in said elongated holder elements;

and wherein said eccentric clamping means (33, 33', 33", 40) are positioned in said holder elements (56), the clamping means of any one pair extending into said holder elements from opposite sides thereof.

14. The tool of claim 13, wherein each of said holder elements is formed with a groove to receive a cutter element.

15. The tool of claim 14, wherein each of said holder elements is formed with an axially extending bore (35) located parallel to the groove (5) therein, and positioned radially, with respect to the axis of rotation of said cage structure in alignment with the groove, said bore having an inner bore portion (36) and two outer bore portions located adjacent opposite sides thereof, said eccentric clamping means being retained in said outer bore portions.

16. The tool of claim 15, wherein said eccentric clamping means are rotatable within said outer bore portions about an axis (38) offset with respect to the axis (39) of said inner bore portion (36).

* * * * *